(12) United States Patent
Talwar et al.

(10) Patent No.: US 8,661,047 B2
(45) Date of Patent: Feb. 25, 2014

(54) GEOMETRIC MECHANISM FOR PRIVACY-PRESERVING ANSWERS

(75) Inventors: Kunal Talwar, San Francisco, CA (US); Moritz A. W. Hardt, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/781,000

(22) Filed: May 17, 2010

(65) Prior Publication Data

US 2011/0282865 A1 Nov. 17, 2011

(51) Int. Cl.
G06F 7/00 (2006.01)

(52) U.S. Cl.
USPC ............... 707/757; 707/705; 707/736

(58) Field of Classification Search
None
See application file for complete search history.

(56) References Cited

U.S. PATENT DOCUMENTS

| | | | |
|---|---|---|---|
| 6,778,941 B1 * | 8/2004 | Worrell et al. ............... | 702/176 |
| 7,562,071 B2 | 7/2009 | Dwork et al. | |
| 2003/0069873 A1 * | 4/2003 | Fox et al. ............... | 707/1 |
| 2009/0182797 A1 | 7/2009 | Dwork et al. | |
| 2009/0265242 A1 | 10/2009 | Horvitz et al. | |

OTHER PUBLICATIONS

Kodeswaran, et al., "Applying Differential Privacy to Search Queries in a Policy Based Interactive Framework", Retrieved at << http://aisl.umbc.edu/resources/1250.pdf >>, Proceeding of the ACM first international workshop on Privacy and anonymity for very large databases, Nov. 6, 2009, pp. 8.

Rubinstein, et al., "Learning in a Large Function Space—Privacy Preserving Mechanisms for SVM Learning", Retrieved at http://arxiv.org/PS_cache/arxiv/pdf/0911/0911.5708v1.pdf , In CoRR, vol. abs/0911.5708, 2009, pp. 1-21.

Dwork, et al., "Differential Privacy for Statistics—What we know and What we want to Learn", Retrieved at http://www.cse.psu.edu/~asmith/pubs/2008/DworkSmith.pdf >>, Jan. 14, 2009, pp. 1-16.

Roth, Aaron., "Thesis Proposal—New Algorithms for Preserving Differential Privacy", Retrieved at << http://www.cs.cmu.edu/~alroth/ThesisProposal.pdf >>, Dec. 7, 2009, pp. 1-17.

Sarathy, et al., "Differential Privacy for Numeric Data", Retrieved at << http://www.unece.org/stats/documents/ece/ces/ge.46/2009/wp.9.e.pdf >>, Joint UNECE/Eurostat work session on statistical data confidentiality, Dec. 2-4, 2009 pp. 11.

(Continued)

*Primary Examiner* — Paul Kim
(74) *Attorney, Agent, or Firm* — Micah Goldsmith; Andrew Sanders; Micky Minhas (57) ABSTRACT

A system for answering sets of queries on a set of private data while providing differential privacy protection is provided. The set of queries is received and applied to the set of private data to generate a set of results or answers. A geometric representation of the set of queries is generated. Example geometric representations include polytopes. Error values are generated for the set of queries using a K-norm mechanism based on values sampled from the geometric representation. The sampled values are added to the set of results to provide the differential privacy protection. By generating the error values based on the set of queries rather than the set of results or the set of private data, the amount of error added to the generated results to achieve a level of differential privacy protection is reduced.

14 Claims, 6 Drawing Sheets

(56) References Cited

OTHER PUBLICATIONS

Dwork, Cynthia., "Differential Privacy", Retrieved at << https://utd.edu/~mxk055100/courses/privacy08f_files/differential-privacy.pdf >>, In Proceedings of the 33rd International Colloquium on Automata, Languages and Programming (ICALP), 2006, pp. 1-12.

Reed, et al., "Differential Privacy for Collaborative Security", Retrieved at http://www.cis.upenn.edu/~bcpierce/papers/eurosec2010.pdf >>, In EUROSEC '10: Proceedings of the Third European Workshop on System Security, Apr. 2010, pp. 6.

Barak, et al., "Privacy, Accuracy, and Consistency Too—A Holistic Solution to Contingency Table Release", Retrieved at << http://www.cs.princeton.edu/~boaz/Papers/privacy.pdf >>, Symposium on Principles of Database Systems, Proceedings of the twenty-sixth ACM SIGMOD-SIGACT-SIGART symposium on Principles of database systems, Jun. 11-13, 2007, pp. 9.

Blum, et al., "Practical Privacy: The SuLQ Framework", Retrieved at << http://research.microsoft.com/en-us/projects/DatabasePrivacy/bdmn.pdf >>, Symposium on Principles of Database Systems, Proceedings of the twenty-fourth ACM SIGMOD-SIGACT-SIGART symposium on Principles of database systems, Jun. 13-15, 2005, pp. 15.

Bárány, et al., "Approximation of the Sphere by Polytopes having Few Vertices.", Retrieved at << http://www.ams.org/proc/1988-102-03/S0002-9939-1988-0928998-8/S0002-9939-1988-0928998-8.pdf >>, Proceedings of the American Mathematical Society, vol. 102, No. 3, Mar. 1988, pp. 651-659.

Blum, et al., "A Learning Theory Approach to Non-Interactive Database Privacy", Retrieved at << http://www-cgi.cs.cmu.edu/~avrim/Papers/privacy.pdf >>, Annual ACM Symposium on Theory of Computing, Proceedings of the 40th annual ACM symposium on Theory of computing, May 17-20, 2008, pp. 9.

Boyd, et al., "Convex Optimization", Retrieved at << http://saba.kntu.ac.ir/eecd/taghirad/E%20books/TOC/convex%20optimization.pdf >>, Mar. 2004, pp. 11.

Chaudhuri, et al., "Privacy-Preserving Logistic Regression", Retrieved at << http://www1.ccls.columbia.edu/~cmontel/cmNIPS2008.pdf >>, Information Theory and Applications, Neural Information Processing Systems (NIPS), Dec. 8, 2008, pp. 1-10.

Dyer, et al., "A Random Polynomial Time Algorithm for Approximating the Volume of Convex Bodies", Retrieved at << http://www.stat.duke.edu/~scs/Courses/Stat376/Papers/ConvergeRates/Dyer.pdf >>, Journal of the ACM (JACM), vol. 38, No. 1, Jan. 1991, pp. 1-17.

Dwork, et al., "Our Data, Ourselves: Privacy Via Distributed Noise Generation", Retrieved at << http://theory.stanford.edu/~kngk/papers/ourDataOurselves.pdf >>, In EUROCRYPT, vol. 4004, 2006, pp. 18.

Dwork, et al., "Calibrating Noise to Sensitivity in Private Data Analysis", Retrieved at << http://people.csail.mit.edu/asmith/Ps/sensitivity-tcc-final.pdf >>, Third Theory of Cryptography Conference (TCC 2006), Mar. 2006, pp. 1-20.

Dwork, et al., "The Price of Privacy and the Limits of LP Decoding", Retrieved at << http://dsp.rice.edu/sites/dsp.rice.edu/files/cs/DworkMcSherryTalwar.pdf >>, Annual ACM Symposium on Theory of Computing, Proceedings of the thirty-ninth annual ACM symposium on Theory of computing, Jun. 11-13, 2007, pp. 85-94.

Dinur, et al., "Revealing Information while Preserving Privacy", Retrieved at http://reference.kfupm.edu.sa/content/r/e/revealing_information_while_preserving_p_54665.pdf >>, Symposium on Principles of Database Systems, Proceedings of the twenty-second ACM SIGMOD-SIGACT-SIGACT symposium on Principles of database systems, Jun. 9-11, 2003, pp. 1-16.

Dwork, Cynthia., "Differential Privacy: A Survey of Results", Retrieved at << http://research.microsoft.com/en-us/projects/DatabasePrivacy/tamc.survey.pdf >>, Theory and Applications of Models of Computation, 5th International Conference, Tamc 2008, vol. 4978, Apr. 25-29, 2008, pp. 1-19.

Dwork, et al., "New Efficient Attacks on Statistical Disclosure Control Mechanisms", Retrieved at << http://research.microsoft.com/pubs/74337/dy08.pdf, CRYPTO, vol. 5157, 2008, pp. 13.

Feldman, et al., "Private Coresets", Retrieved at << http://delivery.acm.org./10.114/1540000/1536465/p361-feldman/pdf?key1=1536465&key2=4166088621&coll=GUIDE&dl=GUIDE&CFID=80433860&CFTOKEN=30523186 >>, Annual ACM Symposium on Theory of Computing, Proceedings of the 41st annual ACM symposium on Theory of computing, May 31-Jun. 2, 2009, pp. 361-370.

Giannopoulos, et al., "Random Spaces Generated by Vertices of the Cube", Retrieved at << http://www.springerlink.com/content/ga0k133vptrh0mhu/fulltext.pdf >>, DOI: 10.1007/s00454-002-2779-3, vol. 28, No. 2, Jul. 2002, pp. 255-273.

"Notes on Isotropic Convex Bodies", Retrieved at << http://www.math.uoc.gr/~apostolo/isotropic-bodies.ps >>, Oct. 2003, pp. 137.

Gupta, et al., "Differentially Private Approximation Algorithms", Retrieved at http://www.cs.cmu.edu/~CompThink/probes/papers/private-optimization.pdf >>, Aug. 14, 2009, pp. 28.

Ghosh, et al., "Universally Utility-Maximizing Privacy Mechanisms", Retrieved at << http://arxiv.org/PS_cache/arxiv/pdf/0811/0811.2841v3.pdf, Mar. 20, 2009, pp. 1-16.

Klartag, et al., "On the Hyperplane Conjecture for Random Convex Sets.", Retrieved at << http://arxiv.org/PS_cache/math/pdf/0612/0612517v1.pdf >>, Dec. 18, 2006, pp. 1-14.

Klartag, B., "On Convex Perturbations with a Bounded Isotropic Constant", Retrieved at << http://www.math.princeton.edu/~bklartag/papers/perturb.pdf >>, Geometric and Functional Analysis, vol. 16, No. 6, 2006, pp. 1-16.

Kasiviswanathan, et al., "What can We Learn Privately", Retrieved at << http://arxiv.org/PS_cache/arxiv/pdf/0803/0803.0924v3.pdf, Feb. 19, 2010, pp. 1-35.

Kannan, et al., "Random Walks and an o*(n5) vol. Algorithm for Convex Bodies", Retrieved at << http://matmod.elte.hu/~lovasz/vol5.pdf >>, Random Structures & Algorithms, vol. 11, No. 1, Aug. 1997, pp. 1-54.

Kempe, et al., "A Decentralized Algorithm for Spectral Analysis", Retrieved at << https://graphics.stanford.edu/courses/cs468-05-winter/Papers/Distributed/kempe_mcsherry.pdf >>, Annual ACM Symposium on Theory of Computing, Proceedings of the thirty-sixth annual ACM symposium on Theory of computing, Jun. 13-16, 2004, pp. 561-568.

Kasiviswanathan, et al., "The Price of Privately Releasing Contingency Tables and the Spectra of Random Matrices with Correlated Rows", Retrieved at << http://www.cse.psu.edu/~kasivisw/public.pdf >>, STOC 2010, pp. 50.

Litvak, et al., "Smallest Singular Value of Random Matrices and Geometry of Random Polytopes", Retrieved at << http://www.math.missouri.edu/~rudelson/papers/rand-matr.pdf >>, Advances in Mathematics, 2005, pp. 1-35.

McSherry, et al., "Mechanism Design via Differential Privacy", Retrieved at << http://research.microsoft.com/en-us/projects/databaseprivacy/mdviadp.pdf >>, FOCS, Proceedings of the 48th Annual IEEE Symposium on Foundations of Computer Science, Oct. 21-23, 2007, pp. 10.

Nissim, et al., "Smooth Sensitivity and Sampling in Private Data Analysis", Retrieved at << http://people.csail.mit.edu/asmith/PS/stoc321-nissim.pdf>>, Annual ACM Symposium on Theory of Computing, Proceedings of the thirty-ninth annual ACM symposium on Theory of computing, Jun. 11-13, 2007, pp. 10.

Rastogi, et al., "The Boundary Between Privacy and Utility in Data Publishing", Retrieved at << http://www.vldb2007.org/program/papers/research/p531-rastogi.pdf >>, Very Large Data Bases, Proceedings of the 33rd international conference on Very large data bases, Sep. 23-27, 2007, pp. 531-542.

Vempala, Santosh., "Geometric Random Walks:—A Survey", Retrieved at << http://citeseerx.ist.psu.edu/viewdoc/download?doi=10.1.1.70.5220&rep=rep1&type=pdf >>, MSRI Volume on Combinatorial and Computational Geometry, vol. 52, 2005, pp. 573-612.

* cited by examiner

GEOMETRIC MECHANISM FOR PRIVACY-PRESERVING ANSWERS

BACKGROUND

A system is said to provide differential privacy if the presence or absence of a particular record or value cannot be determined based on an output of the system, or can only be determined with a very low probability. For example, in the case of medical data, a system may be provided that outputs answers to queries supplied such as the number of users with diabetes. While the output of such a system may be anonymous in that it does not reveal the identity of the patients associated with the data, a curious user may attempt to make inferences about the presence or absence of patents by varying the queries made to the system and observing the changes in output. For example, a user may have preexisting knowledge about a rare condition associated with a patient and may infer other information about the patent by restricting queries to users having the condition. Such a system may not provide differential privacy because the presence or absence of a patient in the medical data (i.e., a record) may be inferred from the answers returned to the queries (i.e., output).

Typically, systems provide differential privacy by introducing some amount of error to the data or to the results of operations or queries performed on the data. For example, noise may be added to each query using a distribution such as a Laplacian distribution. However, while such methods are effective, they may add more error than is necessary to provide differential privacy protection.

SUMMARY

A system for answering sets of queries on a set of private data while providing differential privacy protection is provided. The set of queries is received and applied to the set of private data to generate a set of results or answers. A geometric representation of the set of queries is generated. Example geometric representations include polytopes. Error values are generated for the set of queries using a K-norm mechanism based on values sampled from the geometric representation. The sampled values are added to the set of results to provide the differential privacy protection. By generating the error values based on the set of queries rather than the set of results or the set of private data, the amount of error added to the generated results to achieve a particular level of differential privacy protection is reduced.

In an implementation, a set of queries is received by a computing device, and a set of private data is received by the computing device. The received set of queries is applied to the received set of private data to generate a set of results by the computing device. A geometric representation of the set of queries is generated by the computing device. A set of error values is generated based on the geometric representation by the computing device. The set of error values is added to the generated set of results by the computing device.

Implementations may include some or all of the following features. Generating a geometric representation of the set of queries may include generating a polytope from the set of queries. Generating a set of error values based on the geometric representation may include sampling a plurality of values from the generated polytope and generating the set of error values based on the sampled values. The generated polytope may be an isotropic polytope. The set of private data may be medical data, financial data, or census data, for example. Generating the set of error values based on the geometric representation may further include sampling a plurality of values from a gamma distribution and scaling the set of error values based on the sampled values from the gamma distribution.

In an implementation, a first polytope is generated from the set of queries. If the first polytope is an isotropic polytope, a set of error values is generated from the set of queries by the computing device, and the set of error values is added to the set of results by the computing device. Implementations may include some or all of the following features. If the first polytope is not an isotropic polytope, a covariance matrix may be generated based on the first polytope, an eigen-decomposition of the covariance matrix may be determined, the first polytope may be divided into a second polytope and a third polytope based on the eigen-decomposition, a set of error values may be generated based on the second polytope, and the set of error values may be added to the set of results. If the third polytope is one dimensional a set of error values based on the third polytope may be generated, and the set of error values may be added to the set of results. If the third polytope is not one dimensional, a covariance matrix may be generated based on the third polytope, an eigen-decomposition of the covariance matrix of the third polytope may be determined, the third polytope may be divided into a fourth polytope and a fifth polytope, and a set of error values may be generated based on the fourth polytope.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
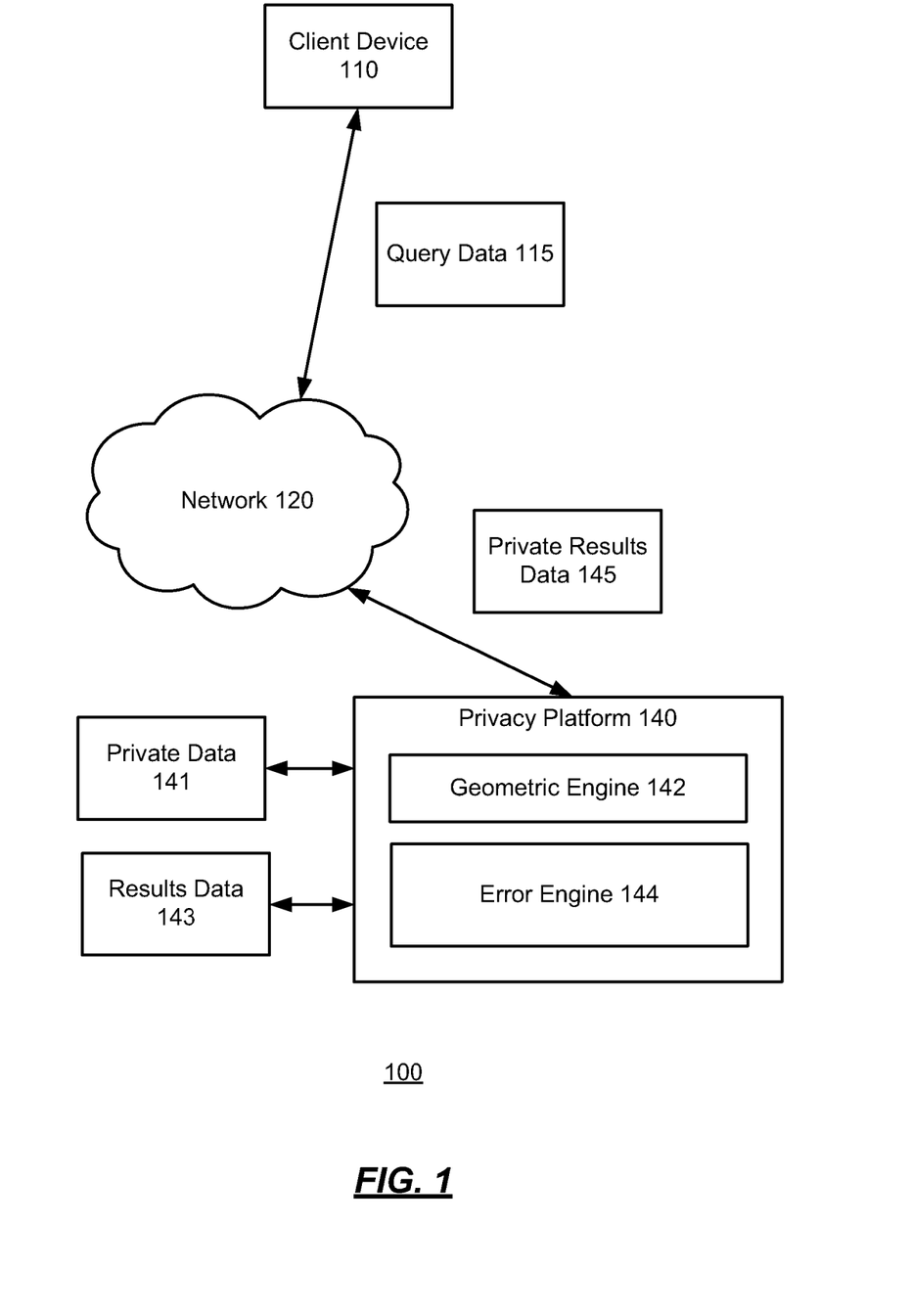
FIG. 1 is a block diagram of an implementation of a system that may be used to provide differential privacy.

FIG. 1 is a block diagram of an implementation of a system 100 that may be used to provide differential privacy. As illustrated, the system 100 includes a privacy platform 140. In some implementations, the privacy platform 140 may receive query data 115 from users of a client device 110. The query data 115 may be received from the client device 110 through a network 120. The network 120 may be a variety of network types including the public switched telephone network (PSTN), a cellular telephone network, and a packet switched network (e.g., the Internet). The client device 110 may comprise one or more general purpose computers such as the computing device 600 described with respect to FIG. 6, for example.

In some implementations, the query data 115 may comprise a set of queries generated by a user to be evaluated by the privacy platform 140 against private data 141. In some implementations, the private data 141 may be a database or set of private data. For example, the private data 141 may be census data, medical data, or financial data. Any type of data may be used. Examples of queries in the query data 115 may be for the number of users having a specific zip code, the number of users having a specific disease, etc.

In some implementations, the private data 141 may be represented as an n-dimensional vector x taken from the set of real numbers (i.e., $x \in \mathbb{R}^n$) where n represents the number of entries in the database. Similarly, the queries that are included in the query data 115 may be represented as linear combinations of all entries in the vector x. For example, the query data 115 may have d queries and may be represented by a set of queries F: $\mathbb{R}^n \rightarrow \mathbb{R}d$. For purposes of illustration, F may be restricted to linear mappings with coefficients in the interval [−1, 1]; however, other mappings and/or intervals may be used. Thus, F may be a d×n matrix with entries in the interval [×1, 1].

The privacy platform 140 may receive the query data 115 and apply the query data 115 to the private data 141 to generate data or a set of results in response to the query data 115. The result of applying the query data 115 to the private data 141 may be comprised within the result data 143. The results data 143 represents the true or actual answers generated in response to applying the queries represented by query data 115 to the private data 141. However, because the results data 143 is the true data it does not satisfy differential privacy and may not be provided to the user of the device 110 (i.e., the user who provided the queries represented by the query data 115).

To provide differential privacy to the data in the private data 141, the privacy platform 140 may use a privacy preservation mechanism to generate private results data 145 from the results data 143. The private results data 145 may then be provided to the user of the device 110 while satisfying differential privacy. In some implementations, the mechanism may add some amount of error or noise to each value of the results data 143 to generate the private results data 145. Because the addition of error may adversely affect the accuracy of the private results data 145 with respect to the results data 143, in some implementations, the privacy platform 140 may attempt to minimize the amount of error added while still providing differential privacy.

A mechanism may be said to satisfy differential privacy, and provide differential privacy protection to the private data 141, if the densities of an output distribution (e.g., private results data 145), using two different sets of query data 115 whose difference is less than 1, are point wise within an $\exp(\epsilon)$ multiplicative factor of each other. As used herein, $\epsilon$ is a parameter that measures the strength of the differential privacy protection afforded by the mechanism to the private data 141. In general, the higher the value of $\epsilon$, the lower the amount of differential privacy protection provided, and the lower the value of $\epsilon$, the higher the amount of differential privacy protection provided. In addition, the greater the amount of differential privacy protection provided, the greater the amount of error that may be added to each value of the results data 143 to generate the private results data 145.

The privacy platform 140 may further include a geometric engine 142. The geometric engine 142 may generate a geometric representation of the query data 115. In some implementations, the geometric representation may be a polytope. A polytope is a geometric object with flat sides, which exists in any general number of dimensions. The generated polytope corresponding to F (i.e., the query data 115) is referred to herein as the polytope K.

In some implementations, the geometric engine 142 may generate the polytope K by projecting F onto a unit/$_1$-ball of dimension n. The dimension n may be the same dimension as the query data 115. Thus, the polytope K may be represented by the formula:

$$K = FB^N \quad (1)$$

Figure 2:
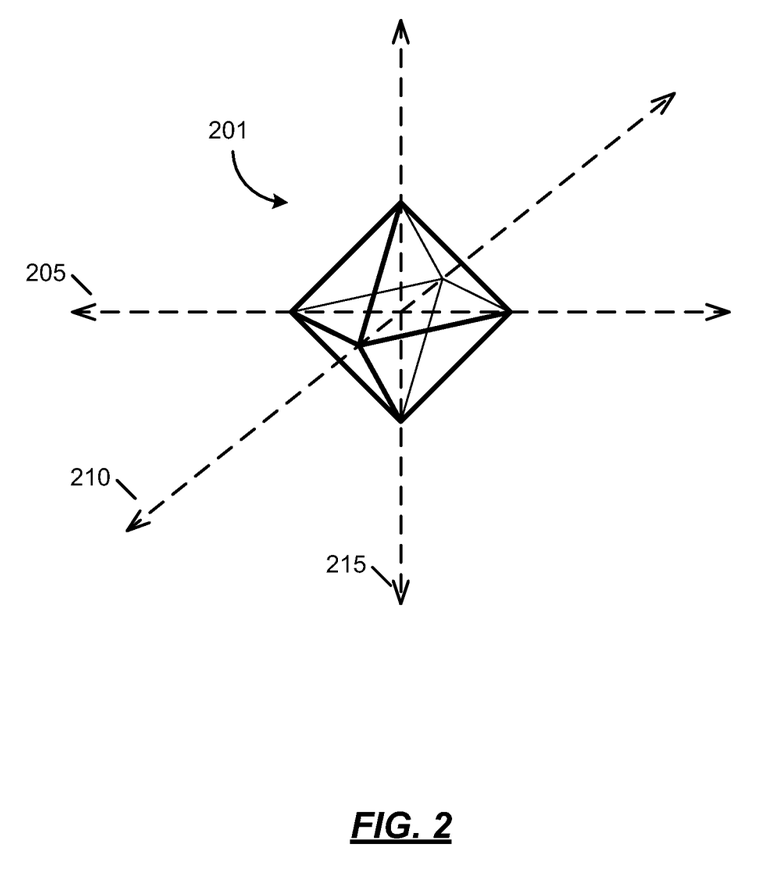
FIG. 2 is an illustration of an example unit/$_1$-ball.
Figure 3:
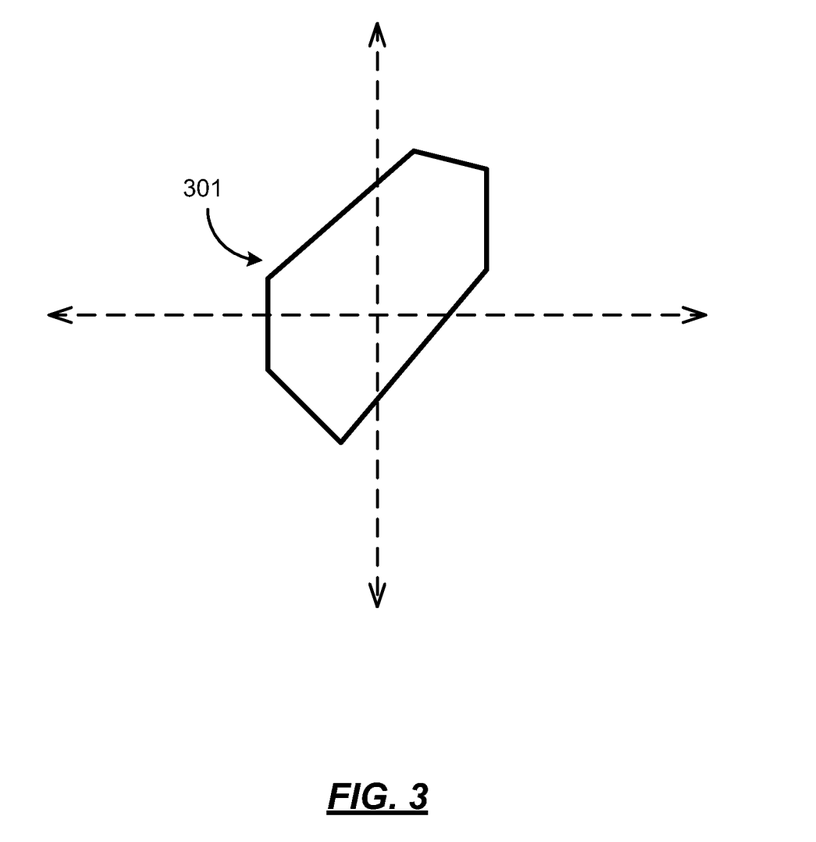
FIG. 3 is an illustration of an example polytope.

An example of such a unit/$_1$-ball of dimension 3 is illustrated in FIG. 2 as a ball 201. As can be appreciated, the unit/$_1$-ball 201 of dimension 3 has a value of 1 and −1 in a direction corresponding to each dimension. The three dimensions of the unit/$_1$-ball are illustrated by axes 205, 210, and 215 respectively. Similarly, an example projection of F onto the ball 201 is illustrated by the polytope 301 shown in FIG. 3.

The privacy platform 140 may further include an error engine 144. The error engine 144 may generate a set of errors that is added to the results data 143 to generate the private results data 145. The error engine 144 may generate error for each entry in the results data 143. The error engine 144 may generate the error for each entry in the results data 143 by sampling values from the polytope K generated from the query data 115.

In some implementations, the set of errors may be calculated by the error engine 144 using what is referred to herein as the K-norm mechanism. According to the K-norm mechanism, the error engine 144 may sample a plurality of values z uniformly from the polytope K. The values z may then be added to the results data 145 (i.e., Fx) generated by applying the query data 115 (i.e., F) to the private data 141 (i.e., the vector x).

In some implementations, each value in z may be further multiplied by a sample r from the gamma distribution based on the dimension d of the query data 115 and the value of $\epsilon$ selected. As described above, the smaller the value of $\epsilon$ selected, the greater the amount of differential privacy protection provided by the error engine 144. The value of $\epsilon$ may be a default value or may be selected by an administrator, for example.

Thus, the K-norm mechanism may be represented by the following equation:

$$k\text{-norm}(F,d,\epsilon) = Fx + zr \quad (2)$$

While the K-norm mechanism described above is effective at generating error from polytopes that are isotropic, or approximately isotropic, it may not be effective where the polytope K is non-isotropic. A polytope is isotropic or generally isotropic if it generally has the same values when measured in different axes. An example of an isotropic polytope is a sphere because it has the same values at each axis. An example of a non-isotropic polytope is a cylinder because it may have different values depending on the axis.

For example, suppose the matrix representing the query data 115 (i.e., F) has random entries in the first row from the interval [1, −1] and random entries from the interval in the second row from the interval [$1/d^2$, $−1/d^2$]. If the error engine 144 generated error using a Laplacian mechanism, it would add $O(1/\epsilon)$ of error to the first entry in the results data 143, and if the error engine 144 generated error using the K-norm mechanism described above it would add $O(d/\epsilon)$ to the first entry in the results data 143. Thus, for non-isotropic polytopes, the K-norm mechanism may generate more error than the Laplacian mechanism.

In some implementations, the error engine 144 may minimize the amount of error generated for non-isotropic polytopes by dividing the polytope K into two polytopes: a first polytope and a second polytope. The K-norm mechanism may be applied to the first polytope as described above. The error engine 144 may recursively further divide the second polytope into two polytopes as described above and apply the K-norm mechanism to the first of the two polytopes.

The error engine 144 may continue to recursively divide the second polytopes into sub-polytope pairs and apply the K-norm mechanism to the first polytopes in the pairs until the remaining polytope is one dimensional. The error engine 144 may divide the polytope K at most log(d) times where d is the dimension of the query data 115 (i.e., F). After the error engine 144 applies the K-norm mechanism to the last sub-polytope of the K polytope, the error engine 144 may then add the generated values from each instance of the K-norm mechanisms to the results data 143 to generate the private results data 145.

In some implementations, the error engine 144 may determine how to divide a polytope into a generally isotropic polytope and a non-isotropic polytope by first generating a covariance matrix of the polytope. A covariance matrix $M_K$ of the of the polytope K is a d×d matrix with an entry ij equal to the formula:

$$M_{ij} = \frac{1}{Vol(K)} \int_K x_i x_j dx \quad (3)$$

After generating the covariance matrix, the error engine 144 may partition the polytope K into two smaller sub-polytopes according to the covariance matrix. In some implementations, the error engine 144 may perform an eigen-decomposition of the covariance matrix and partition the polytope K into two smaller sub-polytopes according to the eigen-decomposition. The error engine 144 may then use the K-norm mechanism on the first of the sub-polytopes and may continue to recursively divide the second of the sub-polytopes into smaller pairs of sub-polytopes and applying the K-norm mechanism to the first of the sub-polytopes. In some implementations, the error engine 144 may continue to divide the sub-polytopes and apply the K-norm mechanism until the remaining polytope is one dimensional.

Figure 4:
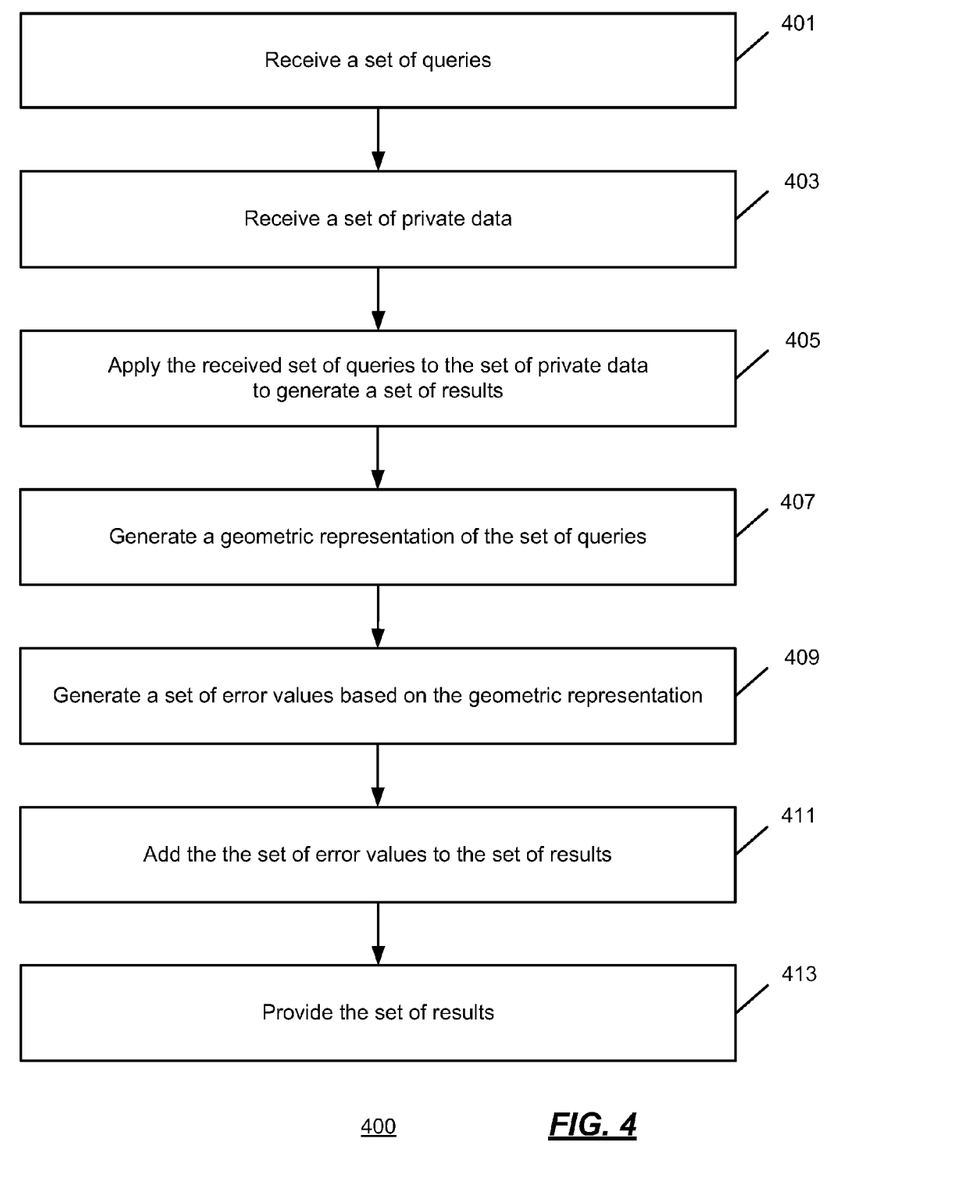
FIG. 4 is an operational flow of an implementation of a method for providing differential privacy protection to a set of results generated according to a set of queries using a geometric representation of the set of queries.

FIG. 4 is an operational flow of a method 400 for providing differential privacy protection to a set of results generated according to a set of queries using a geometric representation of the set of queries. The method 400 may be implemented by the privacy platform 140.

A set of queries is received at 401. The set of queries may be received by the privacy platform 140 from a user at a client device 110. The set of queries may be a request for information from a set of private data such as the private data 141. For example, the private data 141 may be medical data or census records.

In some implementations, the private data 141 may be represented by a vector x having a dimension n, and the set of queries may be represented as linear combinations of the entries in x. For example, the set of queries may be comprise a d×n matrix.

A set of private data is received at 403. The set of private data may be received by the privacy platform 140. The set of private data may be the private data 141 and may be identified in the set of queries.

The set of queries is applied to the set of private data to generate a set of results at 405. The set of queries may be applied by the privacy platform 140. The generated set of results is the "true results", in that the set of results has no error added to it. Thus, in order to provide differential privacy protection to the set of private data, the set of results may not be provided to a user until error has been added to provide differential privacy protection.

A geometric representation of the set of queries is generated at 407. The geometric representation may be generated by the geometric engine 142 of the privacy platform 140. In some implementations, the geometric representation may be a polytope. The polytope may be generated by the geometric engine 142 by applying the matrix representing the set of queries to a unit/$_1$-ball. Other types of geometric representations may also be used.

A set of error values may be generated based on the geometric representation at 409. The set of error values may be generated by the error engine 144. In some implementations, the error values may be generated by error engine 144 sampling from the generated polytope. The samples of the polytope may be generated by using random walks of the generated polytope. In addition, an additional value from the gamma distribution may be used to scale the error values based on the dimension of the set of queries and the level of differential privacy protection desired (i.e., E).

The set of error values is added to the set of results at 411. The set of error values may be added to the set of results by the error engine 144 of the privacy platform 140. The set of results is provided at 413. The set of results may be provided by the privacy platform 140 to a user who provided the set of queries. Because the set of error values was added to the set of results, the set of results can be provided to the user without compromising the differential privacy of the set of private data.

Figure 5:
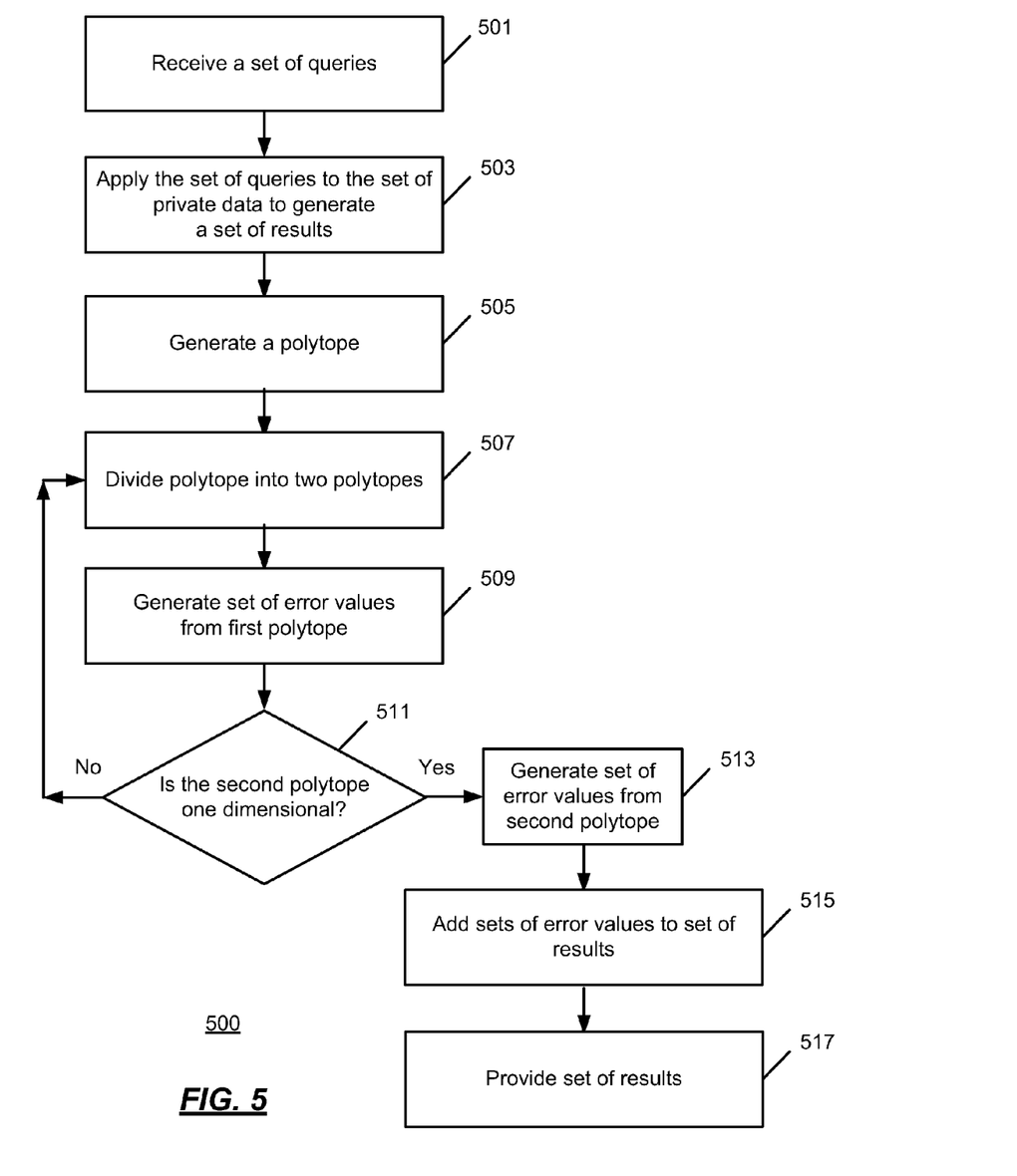
FIG. 5 is an operational flow of another implementation of a method for providing differential privacy protection to a set of results generated according to a set of queries using a geometric representation of the set of queries.

FIG. 5 is an operational flow of method 500 for providing differential privacy protection to a set of results generated according to a set of queries using a geometric representation of the set of queries. The method 500 may be implemented by a privacy platform 140.

A set of queries is received at 501. The set of queries may be received from a user of a device 110 at the privacy platform 140. The set of queries may be queries for a set of private data. The set of private data may be implemented using a variety of data structures and data types and may be private data such as medical data or financial data, for example. In some implementations, the set of private data may be represented by a vector of dimension n, and the set of queries may represent a mapping from the vector of dimension n to a vector of dimension d (i.e., a d×n matrix).

The set of queries is applied to the set of private data to generate a set of results at 503. The set of queries may be applied by the privacy platform 140. The generated set of results is the "true results", in that the set of results has no error added to it. Thus, in order to provide differential privacy protection to the set of private data, the set of results may not be provided to a user until error has been added to provide differential privacy protection.

A polytope is generated from the set of queries at 505. The polytope may generated by the geometric engine 142 of the privacy platform 140. In some implementations, the polytope may be generated by the geometric engine 142 by applying the matrix representing the set of queries to a unit/$_1$-ball. The polytope may be a non-isotropic polytope.

The polytope may be divided into two polytopes at 507. The polytope may be divided by the geometric engine 142 of the privacy platform 140. As described previously, the K-norm mechanism may not produce optimal error values for polytopes that are non-isotropic. Thus, the geometric engine 142 may divide the polytope into a first and a second polytope.

In some implementations, the geometric engine 142 may divide the polytope into a first polytope and a second polytope by generating a covariance matrix from the polytope. The geometric engine 142 may then determine an eigen-decomposition of the covariance matrix. The geometric engine 142 may then divide the polytope into the first polytope and the second polytope according to the eigen-decomposition.

A set of error values is generated from the first polytope at 509. The set of error values may be generated by the error engine 144 of the privacy platform 140. In some implementations, the set of error values may be generated by the error engine 144 using the K-norm mechanism. The K-norm mechanism may generate the set of error values by sampling values from the first polytope. In addition, the error may be scaled according to a value sampled from the gamma distribution and a value of $\epsilon$.

A determination is made as to whether the second polytope is one dimensional at 511. The determination may be made by the error engine 144 of the privacy platform 140. If the second polytope is not one dimensional then the method 500 may recursively continue at 507 where the second polytope may be again divided into two polytopes. Otherwise, the method 500 may continue at 513.

A set of error values is generated from the second polytope at 513. The set of error values may be generated by the error engine 144 of the privacy platform 140 similarly as generated at 509 for the first polytope.

The generated sets of error values are added to the set of results at 515. The sets or error values may be added to the set of results by the error engine 144 of the privacy platform 140. The sets of error values may correspond to each set of error values generated for each polytope generated by the method 500. The error values may provide differential privacy protection to the set of private data. The set of results is provided at 517. The set of results may be provided to the user who provided the set of queries by the privacy platform 140.

Figure 6:
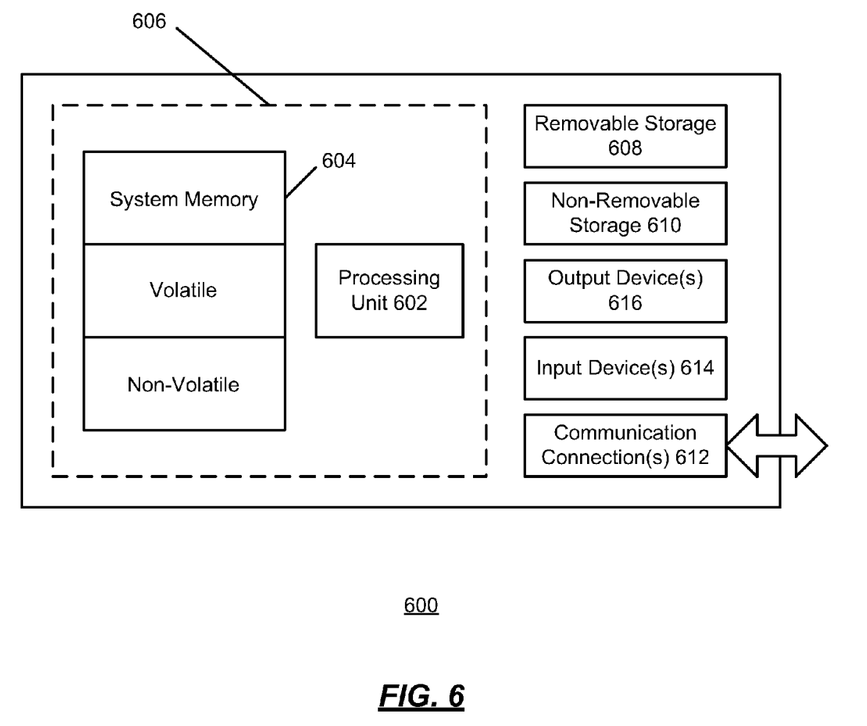
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a set of queries by a computing device;
   receiving a set of predetermined private data by the computing device, wherein the private data comprises data of a plurality of users;
   applying the received set of queries to the received set of private data of the plurality of users to generate a set of results by the computing device, wherein the set of results comprises a plurality of values;
   generating a geometric representation of the set of queries by the computing device;
   generating a set of error values based on the geometric representation of the set of queries by the computing device; and
   providing differential privacy protection to the generated set of results by adding an error value from the set of error values to each value from the generated set of results by the computing device, wherein the differential privacy protection prevents a determination of a presence or an absence of a particular record or a particular value in the set of private data of the plurality of users using the generated set of results.

2. The method of claim 1, further comprising providing the generated set of results having the differential privacy protection.

3. The method of claim 1, wherein the set of private data comprises medical data or financial data.

4. The method of claim 1, wherein generating the geometric representation of the set of queries comprises generating a polytope from the set of queries.

5. The method of claim 4, wherein generating the set of error values based on the geometric representation comprises sampling a plurality of values from the generated polytope and generating the set of error values based on the sampled values.

6. The method of claim 5, wherein the generated polytope is an isotropic polytope.

7. The method of claim 1, wherein generating the set of error values based on the geometric representation comprises multiplying each error value of the set of error values by a sample from the gamma distribution.

8. A system comprising:
   a computing device; and
   a privacy platform that:
      receives a set of queries;
      receives a set of predetermined private data, wherein the private data comprises data of a plurality of users;
      applies the received set of queries to the received set of private data of the plurality of users to generate a set of results, wherein the set of results comprises a plurality of values;
      generates a geometric representation of the set of queries;
      generates a set of error values based on the geometric representation of the set of queries; and
      provides differential privacy protection to the generated set of results by adding an error value of the set of error values to each value from the generated set of results, wherein the differential privacy protection prevents a determination of a presence or an absence of a particular record or a particular value in the set of private data of the plurality of users using the generated set of results.

9. The system of claim 8, wherein the privacy platform further provides the generated set of results having the differential privacy protection through a network.

10. The system of claim 8, wherein the privacy platform generates the geometric representation of the set of queries by generating a polytope from the set of queries.

11. The system of claim 10, wherein the privacy platform generates the set of error values based on the geometric representation by sampling a plurality of values from the generated polytope and generates the set of error values based on the sampled values.

12. The system of claim 11, wherein the generated polytope is an isotropic polytope.

13. The system of claim 8, wherein the privacy platform generates the set of error values based on the geometric representation by multiplying each error value of the set of error values by a sample from the gamma distribution.

14. The system of claim 8, wherein the private data comprises census data, financial data, or medical data.

* * * * *